(12) United States Patent
Emelyanov et al.

(10) Patent No.: US 9,348,622 B2
(45) Date of Patent: May 24, 2016

(54) METHOD FOR TARGETED RESOURCE VIRTUALIZATION IN CONTAINERS

(71) Applicants: Pavel Emelyanov, Moscow (RU); Igor Petrov, Moscow (RU); Stanislav S. Protassov, Moscow (RU); Serguei M. Beloussov, Singapore (SG)

(72) Inventors: Pavel Emelyanov, Moscow (RU); Igor Petrov, Moscow (RU); Stanislav S. Protassov, Moscow (RU); Serguei M. Beloussov, Singapore (SG)

(73) Assignee: Parallels IP Holdings GmbH, Schaffhausen (CH)

( * ) Notice: Subject to any disclaimer, the term of this patent is extended or adjusted under 35 U.S.C. 154(b) by 179 days.

(21) Appl. No.: 14/251,989

(22) Filed: Apr. 14, 2014

(65) Prior Publication Data

US 2015/0150003 A1 May 28, 2015

(30) Foreign Application Priority Data

Nov. 26, 2013 (EA) .................................. 201301283

(51) Int. Cl.
*G06F 9/455* (2006.01)
(52) U.S. Cl.
CPC .............. *G06F 9/455* (2013.01); *G06F 9/4555* (2013.01)

(58) Field of Classification Search
None
See application file for complete search history.

(56) References Cited

U.S. PATENT DOCUMENTS

| | | | | |
|---|---|---|---|---|
| 7,349,970 B2 * | 3/2008 | Clement | ............... | G06F 9/5033 709/201 |
| 2005/0091652 A1* | 4/2005 | Ross | ................... | G06F 9/45533 718/1 |
| 2013/0139157 A1* | 5/2013 | Koh | ....................... | G06F 9/4555 718/1 |

* cited by examiner

*Primary Examiner* — Gregory A Kessler
(74) *Attorney, Agent, or Firm* — Bardmesser Law Group

(57) ABSTRACT

A method and computer program product for targeted container virtualization, where only separate components of a computer system or a server are virtualized. The OS kernel and other server resources are not virtualized. Only selected components—applications or resources are targeted for virtualization instead of virtualization of the entire system. Targeted virtualization provides for more flexible container isolation from each other and from a host node. This, in turn, provides for optimized more flexible cloud infrastructure. Each element within a container virtualization model is optional in terms of virtualization. The element's virtualization option can be turned on and off by an administrator or by a client who owns the container.

17 Claims, 9 Drawing Sheets

METHOD FOR TARGETED RESOURCE VIRTUALIZATION IN CONTAINERS

CROSS-REFERENCE TO RELATED APPLICATIONS

This application claims priority to Eurasian Application No. 201301283, filed on Nov. 26, 2013, which is incorporated herein by reference in its entirety.

BACKGROUND OF THE INVENTION

1. Field of the Invention

The present invention relates to a method for targeted container virtualization where only separate components of a computer system or a server are virtualized.

2. Description of the Related Art

Typically, virtualization at an OS kernel level provides for several isolated user spaces—containers. The containers are identical to a real server from a user point of view. Each container has entire OS components except for the kernel. Thus, the applications from different containers cannot interact with each other.

The containers have allocated resource quotes. For example, a hardware node can have thousands of containers running on it. Each of these containers can only use allocated by quota amount of every server resource. The typical resources are: disk space, I/O operations, operating memory, CPU time, network traffic, etc. The containers have their own sets of user groups, processes and devices isolated from the host OS and from other containers. Virtualization provides for isolation and limitation of resources in the containers.

The containers can be migrated to other host servers almost without any interruptions of their services by a "live migration." The conventional OS-level virtualization solutions are, e.g.: FreeVPS, Icore virtual accounts, FreeBSD Jails, Linux-VServer, OpenVZ, Virtuozzo, Solaris Zones.

Linux kernel with the OpenVZ uses two entities: cgroups (control groups) and namespace. Both of these entities are needed for limiting and controlling the resources allocated for a particular process. For example, a namespace of a network subsystem is a standard network subsystem, a network configuration stack and iptables. The namespaces are created for a memory, for a processor, for a disk and for all other Linux kernel subsystems. Another namespace can be created on the same host system and the two instances can be used separately. For example, in order to allow a container application to apply its own parameters for working with the network. The application can have large buffers, use sockets and use proprietary configuration setting for iptables.

CGroups is a set of limitations for a set of kernel processes. For example, Apache, PHP, MySQL can be encapsulated into a cgroup. Then, the following limitations can be set: CGroup with a modifier webstack can use not more than 10 GB on aggregate, can use not more than 5 processes per CPU Units, can use not more than 3 MB for site cache, etc. Cgroups allow for allocation of resources, such as CPU time, system memory, network bandwidth, or combinations of these resources among user-defined groups of tasks (processes) running on a system. The cgroups can be monitored and configured. The cgroups can be denied access to certain resources. The cgroups can be reconfigured dynamically on a running system. The cgconfig (control group config) service can be configured to start up at boot time and reestablish the predefined cgroups, thus making them persistent across reboots. By using cgroups, system administrators gain fine-grained control over allocating, prioritizing, denying, managing, and monitoring system resources. Hardware resources can be efficiently divided up among the tasks and the users, increasing overall efficiency.

Virtual Machines (VMs) use hypervisor-based virtualization, where the OS kernel is virtualized for each of the VMs in a form of a Guest OS. Container virtualization uses one instance of an OS kernel of the physical host for all of the containers. Therefore, the containers usually work faster than the VMs, and the density of the containers implemented on one physical machine can be much higher than that of the VMs.

Thus, the containers are widely used by hosting providers. A hoster creates a separate container for each of its clients. These containers are, from the user's perspective, practically identical to a physical server in terms of their functionality. Such containers are also sometimes referred to as Virtual Private Servers (VPS). Typically, the containers are employed by service providers using a cloud-based infrastructure. Complete virtualization of all of the cloud resources is often not needed and can be costly. However, none of the existing systems offer a selected or targeted virtualization of separate cloud components or resources.

For example, a clustered system for storing, searching and processing images may only require launching a couple of processes in a virtual environment for editing client's pictures. In this case, virtualization of a network is not required. Virtualization of a user space and creation of process identifiers (pid) is also not needed. Only the operating memory needs to be virtualized.

Another example requiring targeted (selected) virtualization is a backup service. The backup is limited by a disk capacity, because it takes a large amount of data from one disk and places it onto another disk. Therefore, only the disk space and I/O resources need to be virtualized.

Another example that requires only partial (targeted) virtualization is APACHE web server. The web server provides shared hosting—a number of directories containing websites. If the web server needs to open a site upon the http-request, the web-server launches a special process, which serves the http-request by taking data from a certain directory. This process needs to be launched in and isolated environment only using some limited resources. In other words, the entire Linux OS does not need to be virtualized. Only the disk space, I/O, memory and network need to be virtualized. Thus, targeted virtualization (or fragmented isolation) is more efficient than the conventional virtualization such as a conventional system depicted in FIG. 1.

FIG. 1 illustrates conventional container virtualization. The hardware nodes 101.1 and 101.2 can have a plurality of containers 102 implemented on them. Each of these containers has some resources isolated from the host OS 110 and from the other containers. These resources are users and groups 105, system utilities 107, applications 106 and other resources. The resource allocation, isolation and control of the containers are supported by the virtualization layer 109 implemented on the host OS kernel. The host node has hardware components 111 and a network 112. The container 102 can be cloned (103) by creating a copy of the container with a different identifier. Migration 104 of the container 102 includes moving all container files (applications 106, system software 107 and system libraries 108) and its configuration to another node.

FIG. 2 illustrates a conventional schema of container virtualization in more detail. Note that not all (out of about 20) possible virtualization parameters are illustrated. FIG. 2 illustrates different conventional approaches used for isolation of the resources. For example, CPU time is allocated to the container by the hardware node using a special quota. A conventional process planner has two levels. At the first level, the planner decides to which process to give a quant of the CPU time based on a pre-set quota for this container. At the second level, the process planner decides to which process in the given container to give the quant of the CPU time based on standard priorities of the OS kernel (e.g., Linux system).

Setting resource usage limits in the containers is flexible. Therefore, the containers are used in hosting, in developing, testing and running corporate sites. For example, several containers with different configuration can be created on a host and each of the containers can have allocated memory so that the aggregated memory for all of the containers exceeds the memory of the host. Even one container can have allocated memory that exceeds the host memory. Then, if the memory is needed, the memory swap (transfer memory content to the disk) can be used. If the swap is completed, but the memory is still needed, the utility OOM Killer of the host is launched. This utility "kills" the most memory consuming processes in the containers. Thus, the container memory can be controlled in a more flexible manner than a memory of the VMs. When an aggregate memory of the containers exceeds the host memory, this is very convenient for developing tasks.

Likewise, the resources such as disk space, I/O are also allocated to the container according to the corresponding quotas. Some other resources, for example, a network, users and groups, devices, PID tree, IPC objects are virtualized on the container within an isolated space. Other components, such as applications, system software are cloned to on the container. The kernel resources are made available to a container or to multiple containers. In this conventional schema all of the resources are virtualized in the container regardless of the container needs. The container may not need all of the resources as shown in the above examples. Thus, a system, where only resources required by the container are virtualized, is desired.

Accordingly, there is a need in the art for a method for targeted or selected virtualization of components of the containers. Additionally, there is a need in the art for a flexible cloud infrastructure based on more flexible container isolation.

SUMMARY OF THE INVENTION

Accordingly, the present invention is directed to a method and system for targeted container virtualization, where only separate components of a computer system or a server are virtualized that substantially obviates one or more of the disadvantages of the related art.

The OS kernel is not virtualized. Other server resources can be optionally virtualized. In other words, only selected components—applications or resources are targeted for virtualization instead of the virtualization of the entire system. Targeted resource virtualization provides for more flexible container isolation from each other and from a host node. This, in turn, provides for optimized more flexible cloud infrastructure.

According to an exemplary embodiment, each element within a container virtualization model is optional in terms of virtualization. The element virtualization option can be turned on and off by an administrator or by a client who owns the container. Such an Application Container does not launch the entire set of OS components. Instead, it launches only some required container processes. Note that these processes are limited according to what the client needs and not by hard quotas.

An innovative concept of the Application Containers is based on OpenVZ solution. If host wants to see list of all running processes, the ps-lc command is issued. This command shows all host processes including the processes running inside the container. The command find (for finding the files) shows all files including the files inside the container. This is possible because the host and the container operate in the same address, disk and network space. Thus, the host has additional means for controlling the containers.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIG. 5 illustrates a schematic diagram of an exemplary computer or server that can be used in the invention;

Figure 6:
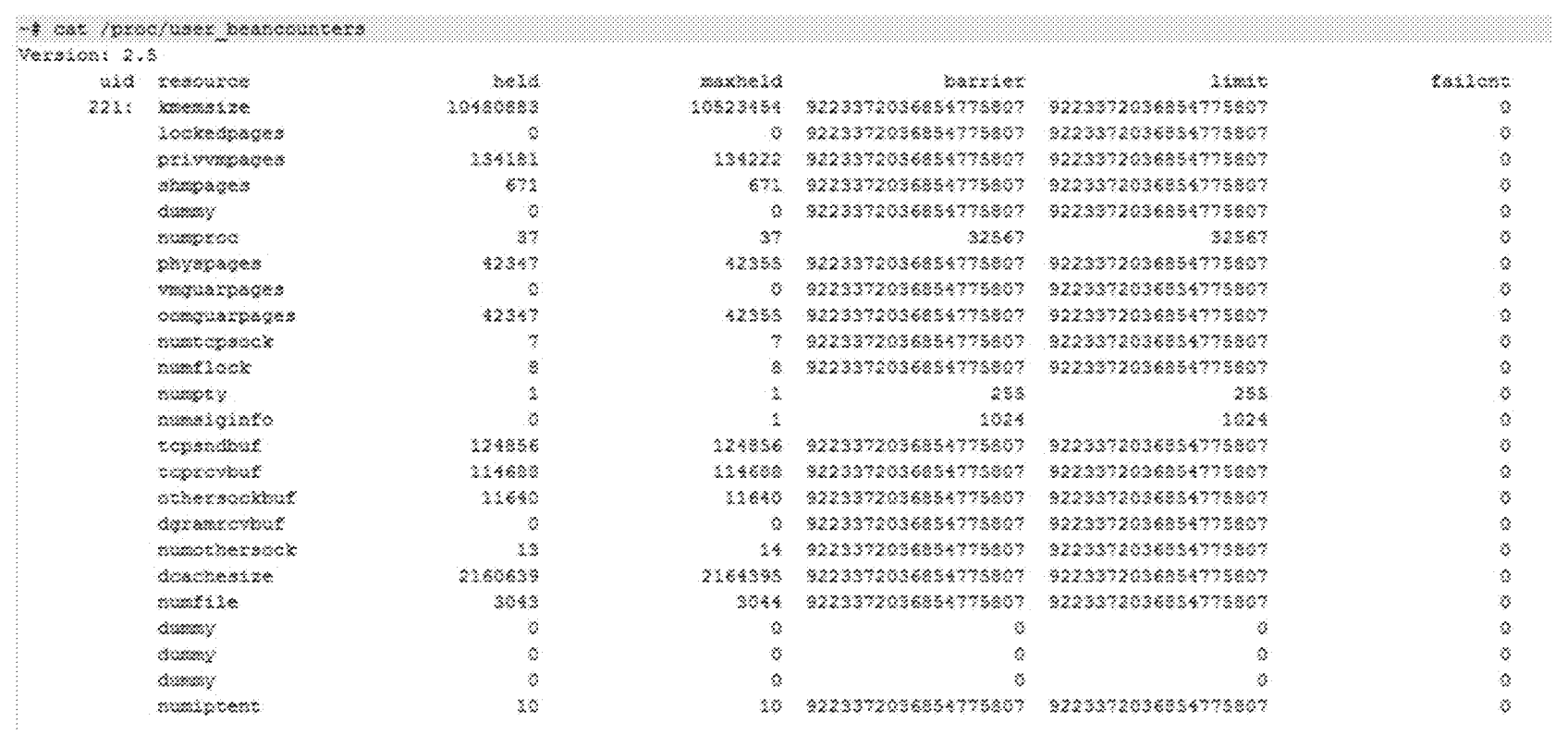

FIG. 6 illustrates the output of the command <<cat/proc/user_beancounters>> in accordance with the exemplary embodiment;

DETAILED DESCRIPTION OF EMBODIMENTS OF THE INVENTION

Reference will now be made in detail to the embodiments of the present invention, examples of which are illustrated in the accompanying drawings.

The present invention is directed to a method for targeted container virtualization, where only separate components of a computer system or a server are virtualized that substantially obviates one or more of the disadvantages of the related art.

The OS kernel and some server resources are not virtualized. Only selected components—applications or resources are targeted for virtualization instead of virtualization of the entire system. Targeted virtualization provides for more flexible container isolation from each other and from a host node. This, in turn, provides for optimized more flexible cloud infrastructure, including multiple containers.

According to an exemplary embodiment, each element within a container virtualization model is optional in terms of virtualization. The element virtualization option can be turned on and off by an administrator or by a client who owns the container. Such Application Container does not launch the entire set of the OS components. Instead, it launches only some required container processes. Then, these processes are limited according to what the client needs and not by hard quotas.

Examples of virtualized resources can be, e.g.:

Memory—i.e., hardware shared memory, number of RAM pages;

I/O operations—in computing, input/output or I/O is the communication between an information processing system (such as a computer) and the outside world, possibly a human or another information processing system. Inputs are the signals or data received by the system, and outputs are the signals or data sent from it.

Disk—number of open files, amount of swap space.

Network—isolated stack, e.g., links, addresses, routes, netfilter rules and sockets.

Users and groups—if it is virtualized, then users in container have internal accounting (user with uid=3, 4). The host has its own and separate users with uid=3, 4. If it is not virtualized container has uid=3, 4 and host has uid=5, 6 . . . (rather than uid 3 and 4).

Devices—either per-container access rights to devices (e.g., shared disk can only be read or mounted with file system by containers), or different mappings from device ID (major: minor pair in Linux) into real hardware.

PID tree—similar to the situation with users described above.

IPC objects—if virtualization is turned on, then container and host have separated queues of requests to the processor.

User applications—for example, there is an application "apt-get" for software updating. If virtualization is turned on, then apt-get in the container and in the host are different applications in different folders and have files with a different config. If virtualization is off, then apt-get is a single application on the host that can be used by container as well.

System modules—similar to the situation with applications.

Figure 3:
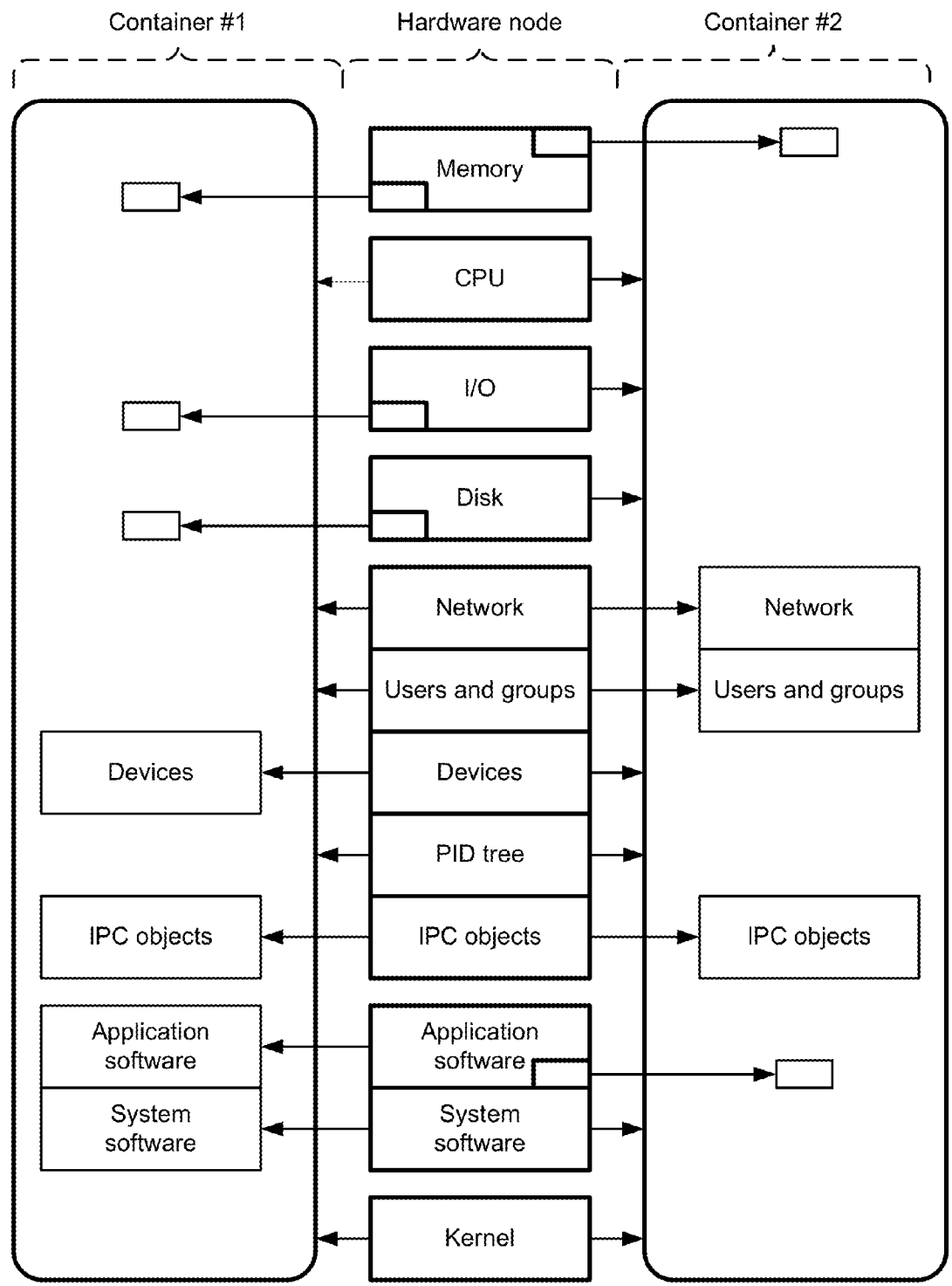
FIG. 3 illustrates a targeted virtualization schema, in accordance with the exemplary embodiment.

FIG. 3 illustrates a targeted virtualization schema, in accordance with the exemplary embodiment. FIG. 3 illustrates Application Container virtualization for two containers. The Container #1 and the Container #2 can require different level of virtualization. In other words, the Containers require a different set of virtualized resources. For example, the Container #1 needs virtualization of: Memory, I/O, Disk, Devices, IPC objects, Applications and System software. The Container #1 uses these resources in isolation and/or by allocation quota. The Container #1 uses the following resources CPU, Network, Users and groups, PID tree as shared resources with the OS kernel. The OS kernel may not be virtualized and is used in the same manner as in the conventional virtualization scheme. However, the OS kernel includes some container virtualization components. These virtualization components can be turned if required by a particular application container.

The exemplary Container #2 uses only virtualization of memory, Network, Users and groups, IPC objects and Application software. Container #2 uses CPU, I/O, Disk, Devices, PID tree and System software as shared resources from the host node that are not virtualized. Thus, targeted virtualization is implemented for the Container #1 and the Container #2. The illustrated targeted virtualization approach advantageously saves the disk space. The targeted virtualization approach allows for a larger number of containers that can be implemented on a single hardware node. The proposed approach provides for more flexibility in managing the containers. It also provides for higher efficiency if I/O or other resources are not virtualized. In general, any resource that is not virtualized improves efficiency of the system.

Figure 4:
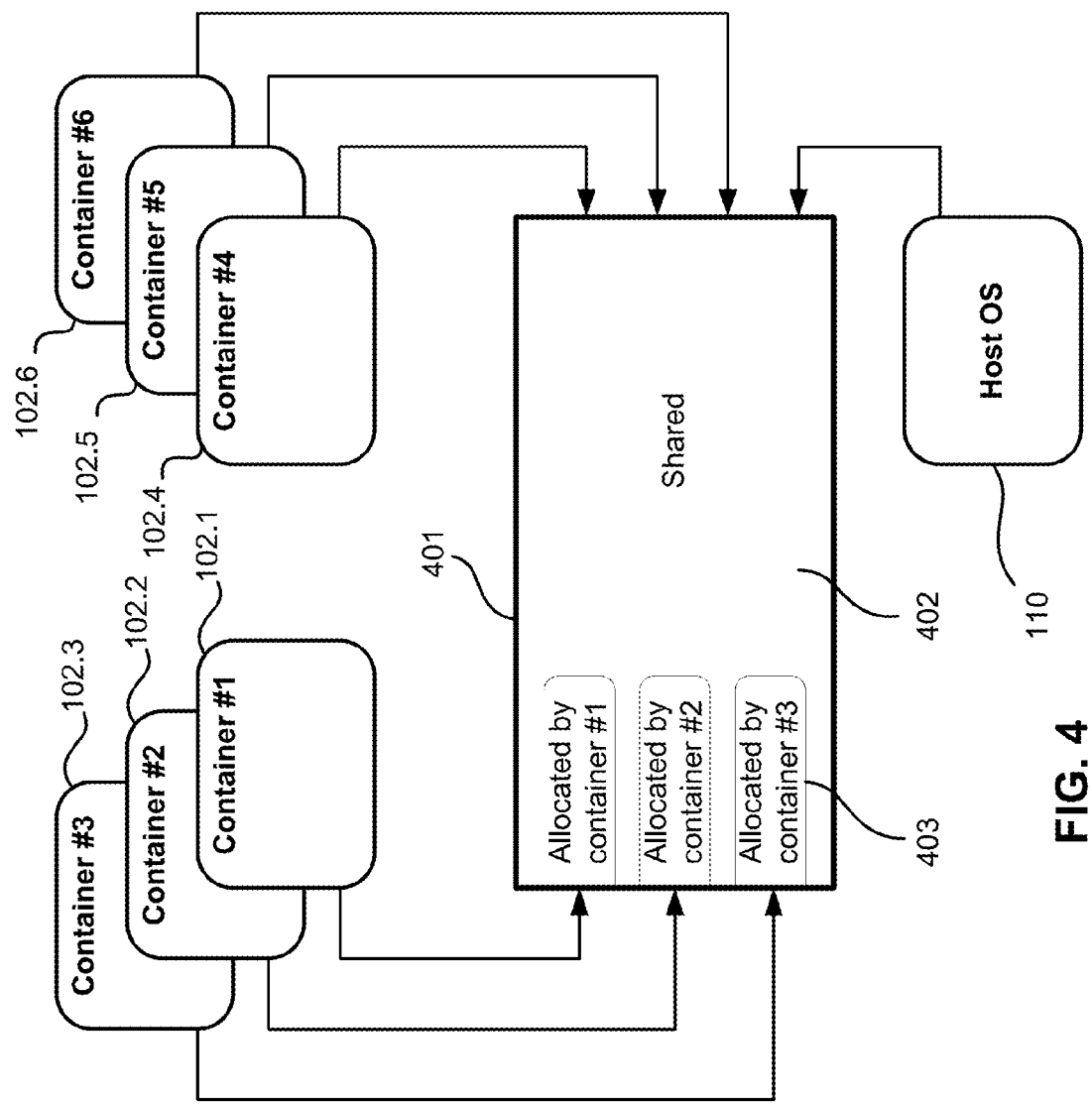
FIG. 4 illustrates application container virtualization for memory, in accordance with the exemplary embodiment.

A user of the container can, advantageously, turn on and off the resources based on a current need. Components of virtualization can be turned ON/OFF by means of, for example: a) command line with needed parameters; b) commenting on/off of lines with references to resource being virtualized in a configuration file; c) GUI software, if it is exists. This provides a user with more flexibility and makes containers more suitable for use in a cloud infrastructure. FIG. 4 illustrates Application container virtualization of memory by several containers. The containers 102.1, 102.2 and 102.3 use virtualized memory. The containers 102.1, 102.2 and 102.3 have allocated (according to a quota) isolated memory sections 403 within a shared memory 401. However, the containers 102.4, 102.5 and 102.6 do not use virtualized memory. Instead, these containers use a shared memory area 402 of the memory 401 together with some of the containers implemented on the host OS 110.

According to the exemplary embodiment, the container application can see that the container is divided into several parts. Some parts can be completely isolated from other containers and from the host OS. Some other parts can be used together with the host OS and other containers. In case of Linux, the OS kernel is modified. A set of special utilities is provided for creation and management of the containers. Conventional systems, upon creation of the container, set up resource usage quotas for each of the resources (or they are set by default). According to the exemplary embodiment, if a quota is not set for a particular resource, the resource is shared by all of the containers that do not have this resource virtualized and allocated. Note that the exemplary embodiment can be implemented with any OS.

According to the exemplary embodiment, a container creator (a person or an application) can see an on/off switch for each of the container resources. For example, if "Virtualize Memory" switch is on, the memory is virtualized for the given container. This means that the memory for this container is allocated according to a certain quota and nobody else can use the allocated memory. If the "Virtualize Memory" switch is off, the container uses the shared memory of the hardware node. Additionally, the hoster can share some resources between containers. For example, a user can have a hosted site, which has a low number of requests. The hoster provides statistics to the site owner regarding consumption of resources and quotas, such as memory, I/O, processor, disk, database, and so on. The statistics reflect actual usage of the resources. As the number of visitors to the site grows, the frequency of exceeding the quotas also grows, which can trigger "abuse notices" from the hoster. However, many hosters would not disable the site, despite it going over the quota—in a sense, this is a consequence of sharing resources with other users, whose sites have lower resource usage than their quotas permit. Conventional co-location or Virtual Private Servers would not permit this, since the quotas are "set in stone." On the other hand, an experienced user can configure his environment in an optimal manner.

The client can see the switches in his hosting control panel, and the administrator can see the switches in a configuration text file. For example, if the line with memory is commented, then virtualization is switched off (for shared memory), otherwise, if there is no comment, then memory virtualization is switched on (the user cannot "take" more memory than his quota, and will pay only for what the quota allows).

According to the exemplary embodiment, the configuration file can have different formats. However, the resource can be only in one of the states: on or off (1 or 0). An example of the configuration file is:

100.conf:
memory_manager=on
io_manager=on
network_virt=on
pid_virt=off

This means that the container with the id=100 has virtualization turned on for memory, IO and network resources. Virtualization of the pid is turned off.

If a command line "vzctl start 100" is executed, then the container with the id=100 uses all values from the 100.conf file without any modifications. The command line "vzctl start 100 -io_manager=off" means that all resources are taken from the configuration file, but the io-manager state is taken from the command line.

According to the exemplary embodiment, the container isolation rules are made somewhat less restrictive and more flexible. Each container has its own configuration file indicating which virtualization components should be used. Note that the containers have the same sets of resources, but different containers can have different virtualization rules for IO, CPU, PIDs, network, etc. This allows for a more flexible and more efficient cloud infrastructure. In the cloud we can define three types of the containers:

1. A resource-only container, which has only memory, CPU, IO and net bandwidth resource limited and controlled. This is useful for cloud services, that are not supposed to be migrated from one node to another;
2. A resource+namespaces container, which is type 1+virtualized IDs, like PIDs, net stack, IPC, etc. This container type can be good for the same use-case as in type 1, but with an ability to migrate it to another host for load balancing; and
3. Type 2+isolated FS, which can be used for the same plus for solving the multi-tenancy issue.

The cloud infrastructure is based on clients paying for the exact time of use of a particular service. In a conventional scenario, a container with all of its service and applications is launched, and the client pays for the time of use of the entire container whether he uses certain services or not.

The cloud infrastructure based on targeted virtualization allows the client to pay only for separate container services used by the client. If a service is not virtualized and is needed only from time to time, the client pays less. According to the exemplary embodiment, virtualization switches can be implemented for:

Files (i.e., system libraries, applications, virtualized file systems/proc and /sys, virtualized blocking utilities, etc.);
Users and groups (i.e., container own users and groups including root directories);
Process trees (i.e., when virtualization is on, the container sees only its own processes, beginning with init; process identifiers are also virtualized, thus PID of the init application equals to 1);
Network (i.e., a virtual network device venet allows the containers to have their own IP addresses, sets of routing rules and firewalls);
Devices (a server administrator can grant the container access to physical devices, such as network adopters, gateways, disk partitions, etc.); and
Inter-process communication (IPC) objects (i.e., shared memory, synchronization primitives, messages).

In other words, container isolation is fragmented—some of the above components can be virtualized and isolated and some can be shared by other containers.

According to the exemplary embodiment, the targeted (selective) virtualization allows to save a disk space. The OS files do not need to be stored in each of the containers. Only some of the files that are used by the container are stored. A larger number of the containers can be launched on each node (i.e., higher density). The proposed approach to virtualization also provides for more flexible container management by a user or an administrator. The administrator can save resources and efficiently allocate loads created by container applications. Additionally, the administrator can configure only the resources that are going to be virtualized and used, instead of all of the resources.

The clients of the containers that have some non-isolated (i.e., non-virtualized) resources can "see" each other's resources. This can be advantageous, for example, a common network resource does not require assigning an IP address to each of the containers. It also does not require Network Address Translation. The efficiency of a cloud infrastructure consisting of fragmented containers can be more efficient. For example, disk I/O operations that are not virtualized work faster than the virtualized I/O operations. According to the exemplary embodiment, the cloud infrastructure is the cloud containing the applications (services). The cloud allows to abstract from the OS.

In order to implement an Application Container (i.e., a container with selected virtualization), the configuration file vps.basic can be edited by a text editor as a comment, so it becomes invisible for configuration utility. For example, the section reflecting memory is made invisible. Then, when the container is created, memory quota is not applied, and the container uses the shared memory of the hardware node. According to the exemplary embodiment, the container is launched by the command vzctl start.

This command sets up all network interfaces, initializes VPS quota, if needed, and starts the init process inside the Virtual Private Server (i.e., the container). Note that in case of Linux OS, starting of the init file can be skipped. In other words, Linux utilities are not used in the container. Instead, the configuration procedure only indicates the applications that need to be launched inside the container (i.e., for example, Apache or PHP). In other words, instead of launching the OS resources only selected applications are launched. Thus, the costs of the container operation are reduced and the container-based cloud system becomes more flexible. Note that other OSs can be used.

An example of the command line "vzctl start 100 - -apache-virt=on - -php-virt=on - -perl-virt=off" means that the container with the id=100 has virtualization on for the Apache and PHP applications (i.e., launched in isolation), but Perl is shared with the host (not virtualized). The line "vzctl start 100 - -memory-manager=on - -pid-virt=off" means that the container with the id=100 has memory virtualization on and the shared pid tree (virtualization is off).

Figure 1:
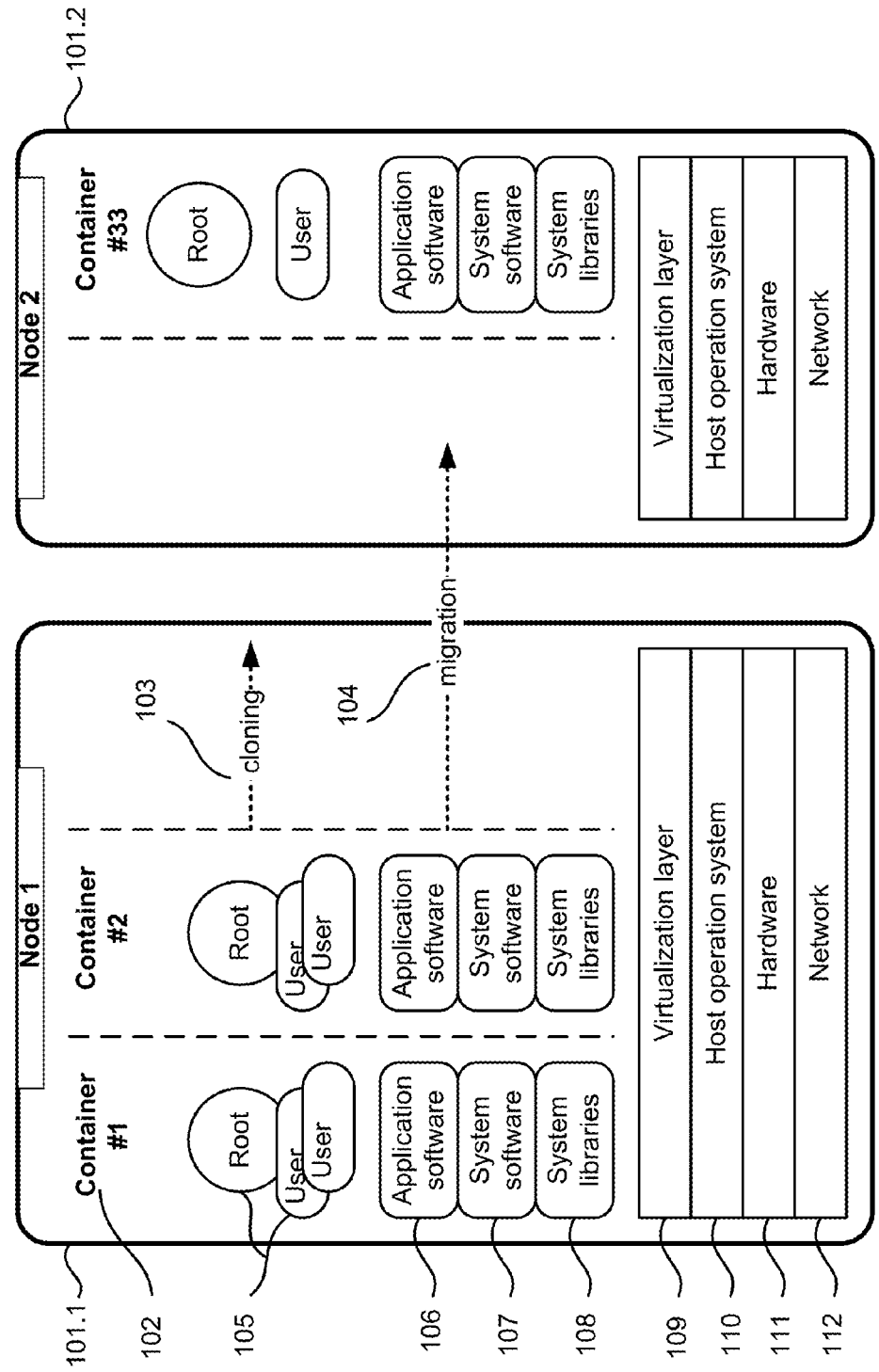
FIG. 1 illustrates a conventional containers located on different hoist nodes.
Figure 2:
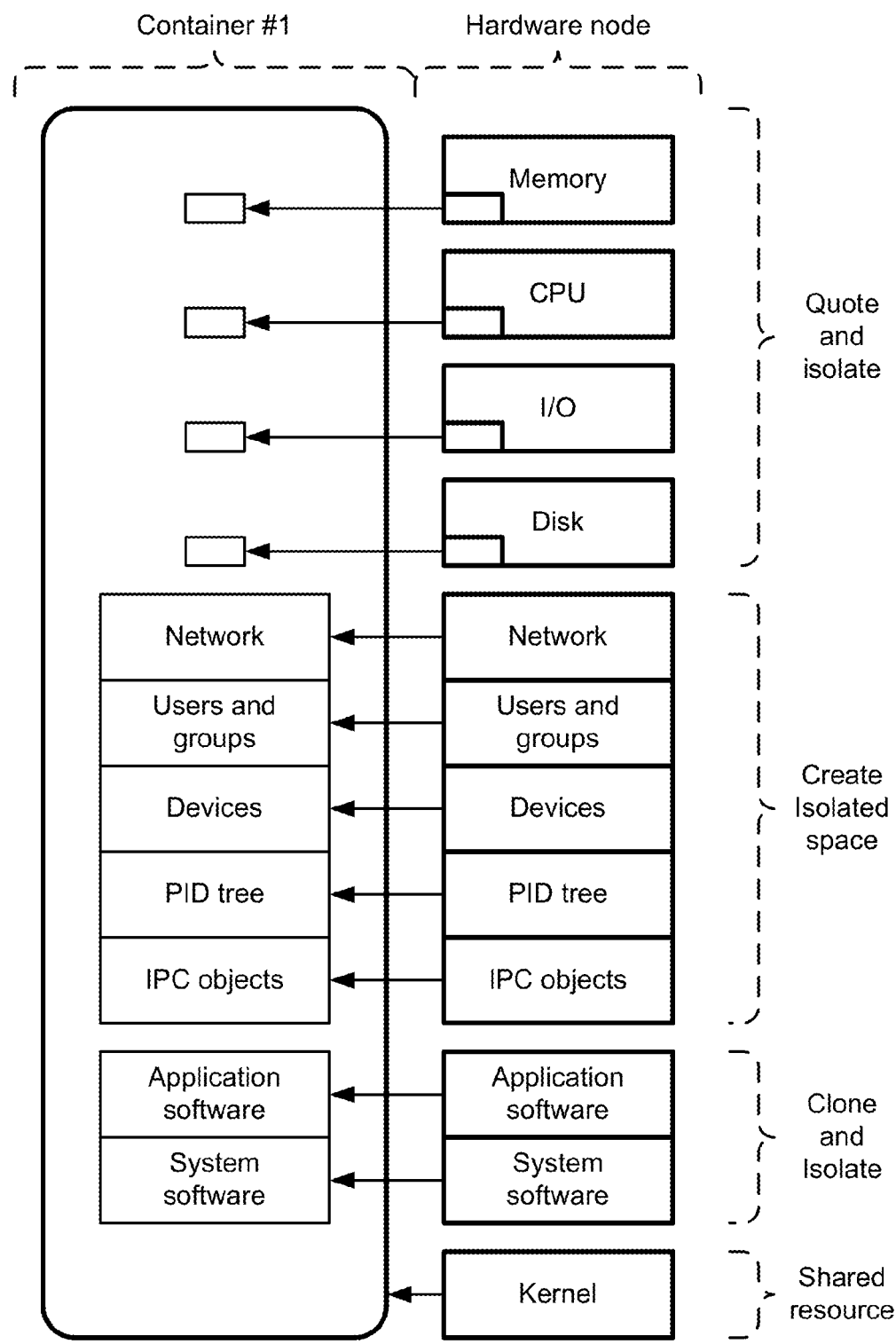
FIG. 2 illustrates a conventional use of resource by a container.

According to the exemplary embodiment, the host OS is not virtualized in a form of a Guest application. The main resources that can be virtualized (or not) are shown in FIGS. 2 and 3. In addition to the described resources the User Beancounters can have a virtualization option. The Beancounters are sets of counters, limits and guarantees for each of the containers. A set of parameters (approximately 20) is used to cover all aspects of container functionality. The parameters are selected in such a way that neither of the containers can use up a resource limited for the entire server (node). Thus, the containers cannot hinder the operation of each other. User Beancounters are a set of limits and guarantees controlled per container.

The Parameters are:

Primary Parameters:

numproc—Maximum number of processes and kernel-level threads allowed for this container.

numtcpsock—Maximum number of TCP sockets.

numothersock—Maximum number of non-TCP sockets (local sockets, UDP and other types of sockets).

vmguarpages—Memory allocation guarantee.

Secondary Parameters:

kmemsize—Size of unswappable memory in bytes, allocated by the operating system kernel.

tcpsndbuf—The total size of buffers used to send data over TCP network connections. These socket buffers reside in "low memory".

tcprcvbuf—The total size of buffers used to temporary store the data coming from TCP network connections. These socket buffers also reside in "low memory".

othersockbuf—The total size of buffers used by local (UNIX-domain) connections between processes inside the system (such as connections to a local database server) and send buffers of UDP and other datagram protocols.

dgramrcvbuf—The total size of buffers used to temporary store the incoming packets of UDP and other datagram protocols.

oomguarpages—The guaranteed amount of memory for the case the memory is "over-booked" (out-of-memory kill guarantee).

privvmpages—Memory allocation limit in pages (which are typically 4096 bytes in size).

Auxiliary Parameters:

lockedpages—Process pages are not allowed to be swapped out shmpages—The total size of shared memory physpages—Total number of RAM pages used by processes in a container.

numfile—Number of open files.

numflock—Number of file locks.

numpty—Number of pseudo-terminals.

numsiginfo—Number of siginfo structures.

dcachesize—The total size of dentry and inode structures locked in memory.

numiptent—The number of NETFILTER (IP packet filtering) entries.

swappages—The amount of swap space to show in container. and guarantees controlled per container.

The term Beancounter (user_beancounter or UBC) is a synonym of the CGroups. Each container has its own identifier and virtualization means—the isolation means (name space) and the resource limiting means (i.e., user_beancounters). When the container is created, the Beancounter is defined by two parameters—a threshold and a limit. If the threshold is reached, it is increased by 1. However, the limit cannot be exceeded. In other words, the threshold is needed for informing a container administrator and the limit is used for the actual limitation by the host. Each resource can be seen from the interface "/proc/user_beancounters" or "/proc/bc/<BCID>/resources" as in Application Containers and has five values associated with it: a current usage, a maximum usage (for the lifetime of a container), a threshold, a limit, and a fail counter value. If any resource hits its limit, the fail counter for is the resource is increased. This allows the owner to detect problems in the container by monitoring /proc/user_beancounters in the container.

The Beancounter can be viewed as following:

1) An owner or administrator can view the Beancounters on his terminal by using a command "cat/proc/user_beancounters" or "cat/proc/bc/<BCID>/resources" depending on implementation. Note that BCID is Beancounter ID. A table produced by these commands is illustrated in FIG. 6;

2) A special script can be created for checking the state of the Beancounters according to a schedule. The script can analyze the Beancounters' content and perform the required actions;

3) A container virtualization system monitors the Beancounters in order to limit resource usage.

The resource usage is limited. For example, CPU time is limited. All CPU call from the container processes are converted into a CPU time. If the aggregated CPU time used by the container over a period of time (e.g., in 24 hours) reaches a threshold or exceeds a limit, the scheme of limiting the CPU access by the container processes is implemented. This means that the CPU will process container requests less frequently even the CPU is not busy with other processes. The limits are implemented by the container virtualization technology integrated into the patched Linux kernel. A similar approach can be used with other operating systems as well.

The resource usage can be controlled by a script. For example, the host administrator has created a Beancounter for controlling a number of files in the container. Note that the owner cannot create a Beancounter. A threshold is set at 80,000 files and a limit is 90,000 files. The script reads the data from the Beancounter according to a certain schedule. If the script sees that the number of files is less than 80,000, no actions are taken. If the number of files is larger than 80,000, but smaller than 90,000, the script sends an email notification to the owner of the container indicating that the number of files approaches the limit. If the number of files is larger than 90,000, the script sends a notification the host administrator, who takes appropriate actions for limiting the container files number. The owner can invoke the script at any time using a web interface. The script reads the data out of the bean counter and displays it on the page of the hosting panel.

Thus, the Beancounters are used for logical limitation and real control of resource usage. The user Beancounters can manage a group of processes. The resource usage of these processes is controlled by a set of counters. These counters are controlled by one Beancounter. At the host, one Beancounter monitors the memory and IO together. The Beancounter also monitors aggregate usage of memory and IO by all host processes for billing or for implementing quotas if the limit is exceeded. When the container is launched, a new Beancounter is created for monitoring the usage of memory and IO by the container processes.

In the Application Containers, the container Beancounter can monitor only one parameter. For example, the memory container Beancounter can control memory usage by the container. However the IO can be controlled by the host Beancounter. In a conventional container, this would be impossible—if one makes the Beancounter for the memory only and makes the IO off, then the IO in this container will be consumed uncontrollably.

According to the exemplary embodiment, an OS kernel (Linux or another OS) needs to be patched. The patched (i.e., modified) OS kernel provides for virtualization of selected resources implemented as a separate modules (utilities). If a certain level of virtualization is required by the user of the container, only certain utilities are taken from the OS kernel for creation of the container as opposed to the conventional scenario, where all of the utilities are included into the container. Note that the exemplary embodiment does not prevent creation of the conventional containers with a complete set of utilities. The containers can have a shared resource(s). Namely, the network stack can be shared by all of the containers. In this case, the containers use the networking infrastructure implemented on the hardware node. In this implementation, the network virtualization is switched off for all of the containers.

Note that network virtualization cannot be divided into smaller components. Thus, the network stack is always virtualized in a conventional container. However, in the Application Containers as described here, the network stack can remain un-virtualized. Instead, the host network stack is used. In a conventional container, if the network stack is not virtualized, the container does not have a networking capability. In the exemplary embodiment, the container, advantageously, uses the host networking capability.

The proc filesystem entry showing resource control information is the /proc/user_beancounters file inside a container. /proc/user_beancounters on a Hardware Node contains UBC parameters for all containers running on a Node. An example of content of "/proc/user_beancounters" for beancounter with BCID=221 is on FIG. 6.

The Output Contains the Following Fields:

uid—the numeric identifier of a container;

held—current usage of a resource (an accounting-only parameter);

maxheld—an accounting parameter which shows the maximal value of a resource usage during the last accounting period. This period usually matches the container lifetime;

failcnt—the number of refused resource allocations for the whole lifetime of the process group;

barrier—a control parameter which generally defines the normal resource allocation border. For some resources, the parameter can be undefined, while for others, it may be an effectively limiting parameter;

limit—a control parameter which generally defines the top border for a resource allocation. For some resources, the parameter can be undefined, while for others, it may be an effectively limiting parameter.

Figure 7:
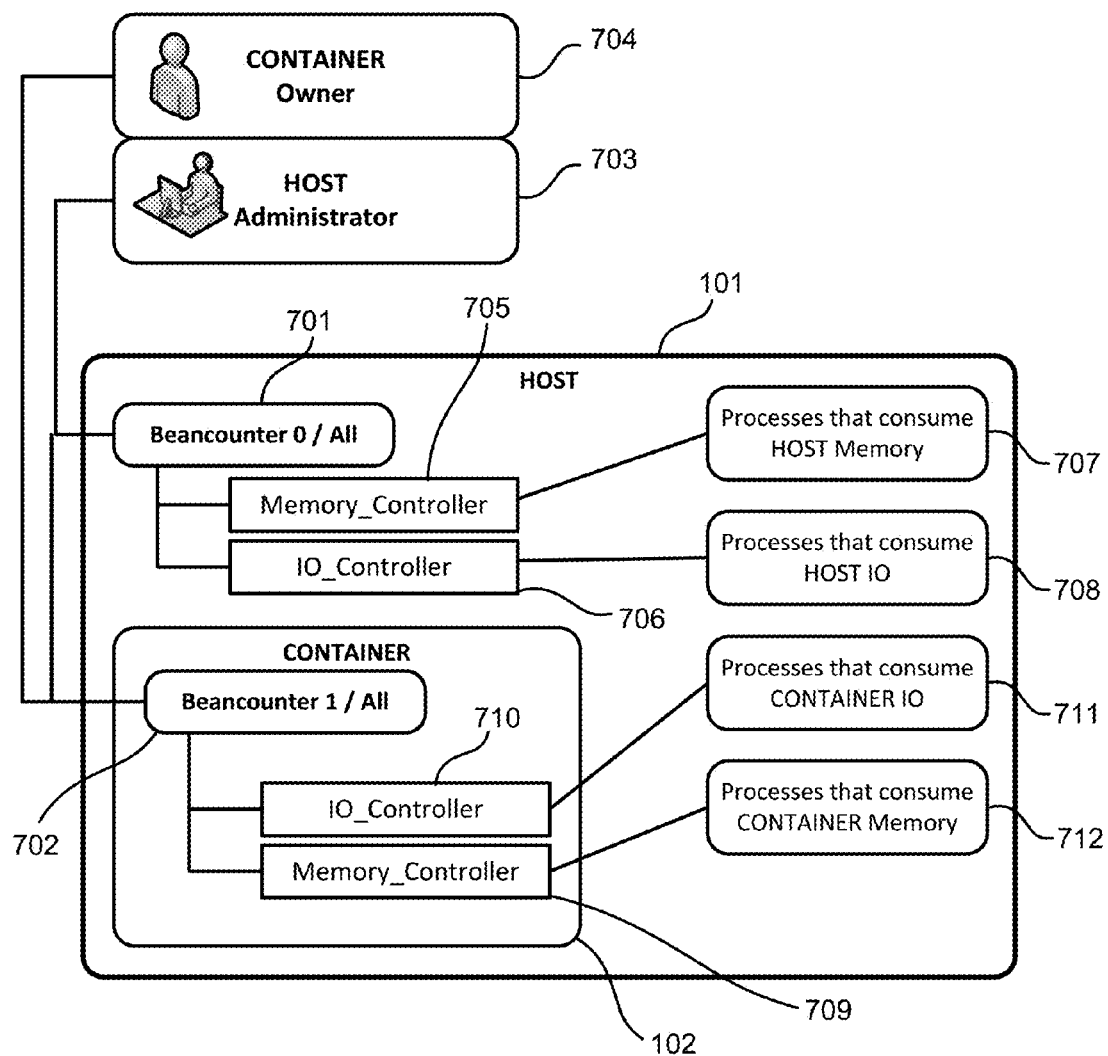
FIG. 7 illustrates the use of Beancounters in a standard container virtualization schema.

FIG. 7 illustrates the use of Beancounters in a standard container virtualization schema. A host administrator 703 creates a Beancounter 701, which controls usage of all resources on the host 101. When the container 102 is created, a Beancounter 702 is created for the container with the same set of the resources. Limits for each of the resources are set. In the example depicted in FIG. 7 only two resources, memory and IO are monitored by respective controllers 709 and 710. A container owner 704 can access the resource usage statistics by requesting the Beancounter 702. The container owner 704 can be given the rights (depending on billing solutions) for configuring limits of resource usage via the Beancounters. A rate plan of the owner can change based on the configuration of the limits. The use of memory 712 by all container processes is controlled by a controller 709. A controller 711 controls I/O usage by all the container processes.

Figure 8:
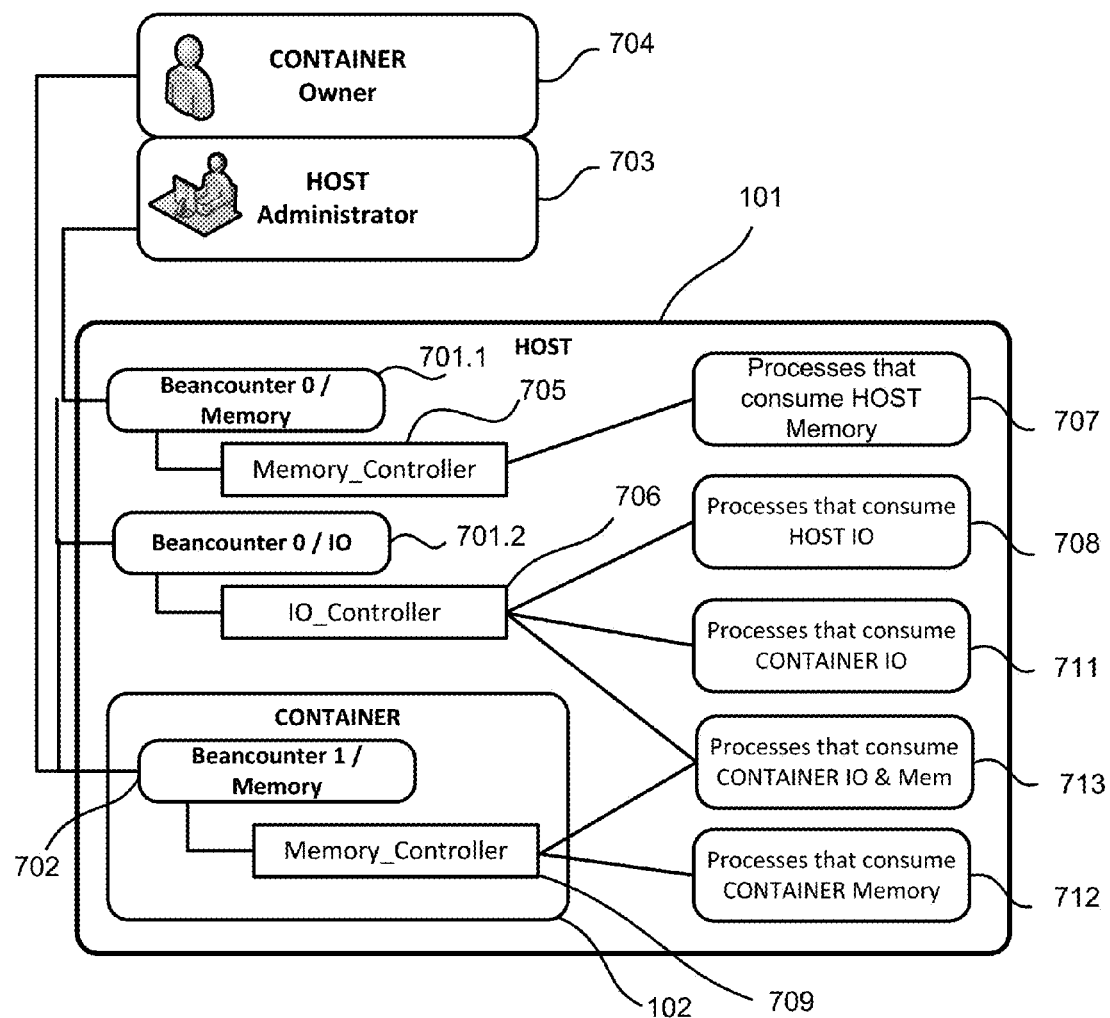
FIG. 8 and FIG. 9 illustrate the use of Beancounters in container virtualization in accordance with the exemplary embodiment.

FIG. 8 illustrates how the containers are controlled by Beancounters, in accordance with the exemplary embodiment. A host administrator 703 creates the Beancounters 701.1 and 701.2, each of the Beancounters controls one of the host resources. In the example depicted in FIG. 8, the memory is controlled by the controller 705 and the IO is controlled by the controller 706. Note that the Beancounters can be created for all controllable computer resources. According to the exemplary embodiment, when the container 102 is created, it is not necessary to create an entire set of all possible Beancounters. Some of the Beancounters can be omitted. In the example depicted in FIG. 8, the IO control Beancounter is not created. The Beancounter of the container 702 is used for controlling a memory usage by different processes 712. The processes of the container 702 that use IO 711 are monitored by the Beancounter 701.2 on the host. A process, which uses the memory and the IO (e.g., a group of the processes 713) is controlled by the memory controller 709 in the container 102, and is controlled by the IO controller 701.2 on the host 101.

Figure 9:
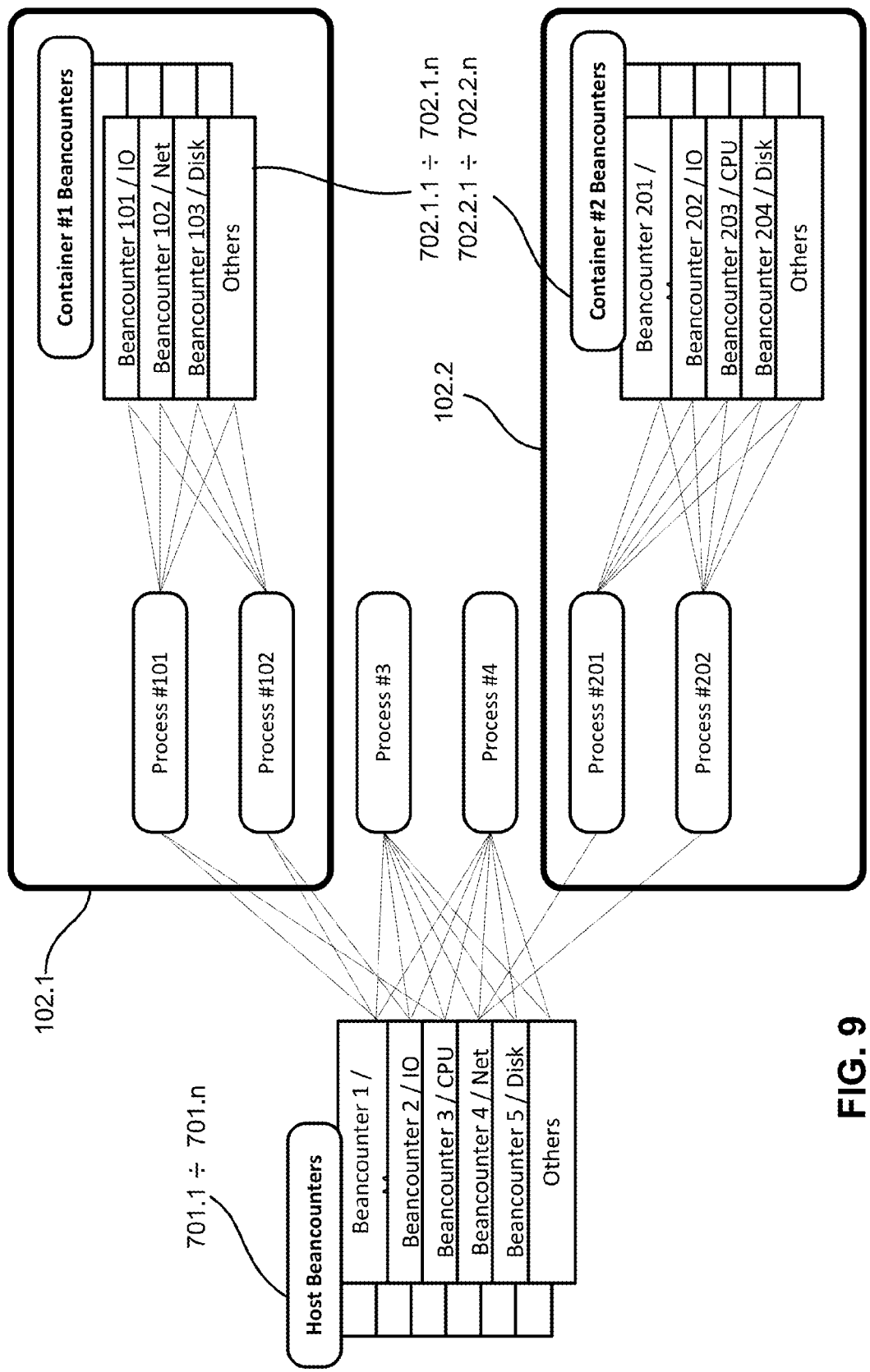

FIG. 9 illustrates how the Beancounters control the processes in accordance with the exemplary embodiment. Each process has one object. The processes #3 and #4 belong to the host. These processes are controlled by all possible Beancounters 701.1-701.$n$ on the host. Each of the Beancounters 701.1-701.$n$ controls a resource used by a process. The processes #101 and #102 belong to the container 102.1. These processes are controlled by the host only for memory and CPU usage. All other resources are virtualized and controlled by the Beancounters 702.1.1-702.1.$n$ of the container 102.1. The processes #201 and #202 belong to the container 102.2. These processes are controlled by the host for network usage only. All other resources are virtualized and controlled by the Beancounters 702.2.1-702.2.$n$ of the container 102.2.

If the virtualization of a particular resource is turned off, the Beancounter is not created in the container. In this case, control of the resource usage by the container is implemented by a host Beancounter as shown in FIGS. 8 and 9. The container processes using a particular resource increase the host counter (not the container counter). According to the exemplary embodiment, the container isolation is less restricting, which makes the container more flexible in terms of use. If virtualization of a container resource is turned off, the resource is not isolated from the same resource of another container.

According to one exemplary embodiment, a selective virtualization/isolation of container resources can be used for optimized data backup. Some containers on the host node can be dedicated to backup operations. The data backup is a procedure that consumes a lot of resources. This procedure is optimized by performing back of only selected container resources. A special container backup utility is used for the backup optimization. The data backup does not require virtualization of a file system and a network stack, because the dedicated container is not intended for a migration. The backup can be performed for a shared file system, for a database or for the entire container. The backup utility is launched on the host system, thus, it can see all host system data. The backup utility turns off the isolation of selected container resources for optimized backup within the container. For example, an isolation of the network stack can be turned off because the backup utility does not need it, since it can use the host network stack.

The isolation of the file system can also be turned off so the back utility can see the entire host file system and backup only the requested files. However, a limit for memory use isolation cannot be lifted because other host applications need to execute and use the memory. The disk I/O isolation cannot be turned off in the dedicated container, because the backup can take up an entire disk I/O resource. The same goes for isolation of the CPU time. Thus, the backup process is optimized and the host OS does not use additional resources for supporting unnecessary isolation.

Figure 5:
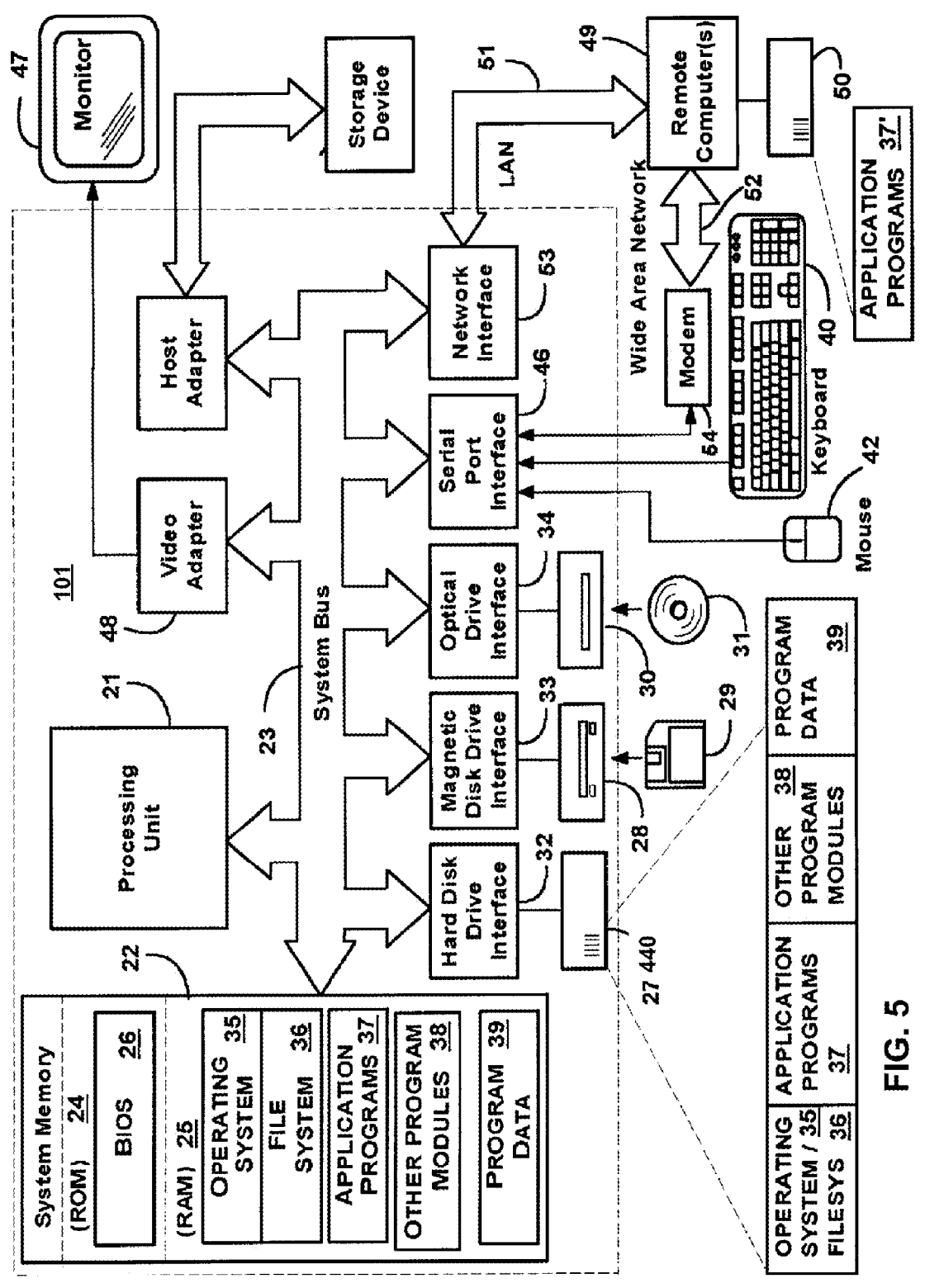

With reference to FIG. 5, an exemplary system for implementing the invention includes a general purpose computing device (i.e., a host node) in the form of a personal computer (or a node) 101 or server or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the computer 101, such as during start-up, is stored in ROM 24. The personal computer/node 101 may further include a hard disk drive for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 101.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., WINDOWS™). The computer 101 includes a file system 36 associated with or included within the operating system 35, such as the WINDOWS NT™ File System (NTFS), one or more application programs 37, other program modules 38 and program data 39. A user may enter commands and information into the personal computer 101 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device, such as a hard disk drive, a magnetic tape, or other type of storage device is also connected to the system bus 23 via an interface, such as a host adapter via a connection interface, such as Integrated Drive Electronics (IDE), Advanced Technology Attachment (ATA), Ultra ATA, Small Computer System Interface (SCSI), SATA, Serial SCSI and the like.

The computer 101 may operate in a networked environment using logical connections to one or more remote computers 49. The remote computer (or computers) 49 may be another personal computer, a server, a router, a network PC, a peer device or other common network node, and typically includes many or all of the elements described above relative to the computer 101.

The computer 101 may further include a memory storage device 50. The logical connections include a local area network (LAN) 51 and a wide area network (WAN) 52. Such networking environments are commonplace in offices, enterprise-wide computer networks, Intranets and the Internet. When used in a LAN networking environment, the personal computer 101 is connected to the local area network 51 through a network interface or adapter 53.

When used in a WAN networking environment, the personal computer 101 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 101, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and apparatus have been achieved. In particular, it should be appreciated by those skilled in the art that the proposed method provides for efficient use of container resource and for more flexible cloud infrastructure.

It should also be appreciated that various modifications, adaptations, and alternative embodiments thereof may be made within the scope and spirit of the present invention. The invention is further defined by the following claims.

What is claimed is:

1. A system for targeted virtualization in containers, the system comprising:
   a host hardware node having a host OS kernel;
   a plurality of host OS kernel objects implemented on the host hardware node; and
   at least one container running on the host hardware node, the container virtualizing the host OS and using selected host OS kernel utilities,
   wherein:
   the host OS kernel utilities have a virtualization on-off switch;
   the selected host OS kernel object is virtualized inside the container if the utility virtualization switch is on; and
   the container uses the host OS kernel objects shared with other containers running on the hardware node.

2. The system of claim 1, wherein the utility virtualization switch is turned on by a container administrator.

3. The system of claim 1, wherein the utility virtualization switch is turned on based on a container user requirements.

4. The system of claim 1, wherein the host OS kernel objects are not virtualized.

5. The system of claim 1, wherein the host OS kernel objects are shared among containers running on the hardware node.

6. The system of claim 1, wherein the container uses selected virtualized host OS kernel objects and shared host OS kernel objects based on user requirements.

7. The system of claim 1, wherein the host OS kernel is patched for selected virtualization of utilities in a form of separate utility modules.

8. The system of claim 1, wherein the host OS kernel objects used for selected virtualization are any of:
   memory;
   I/O operations;
   disk;

network;
users and groups;
devices;
PID tree;
IPC objects;
user applications; and
system modules.

9. The system of claim 1, wherein the container is a part of a cloud-based infrastructure.

10. A computer-implemented method for targeted virtualization in a container, the method comprising:
(a) launching an OS kernel on a host hardware node;
(b) patching the host OS kernel for selected virtualization of host OS kernel objects;
(c) activating a utility virtualization on-off switch on the host OS kernel objects;
(d) selecting the host OS kernel objects to be virtualized by turning the utility virtualization switch on;
(e) launching a first container on the hardware node, the first container virtualizing the host OS;
(f) virtualizing the selected host OS kernel objects inside the container;
(g) repeating steps (b)-(f) for another container launched on the hardware node, wherein the first container shares the host OS kernel objects that are not virtualized with other containers running on the hardware node.

11. The method of claim 10, wherein the selecting of the host OS kernel objects is implemented based on user requirements.

12. The method of claim 10, wherein the containers cannot access objects virtualized inside the other containers.

13. The method of claim 10, wherein the containers form a cloud infrastructure.

14. The method of claim 10, further comprising creating a beancounter for controlling resource usage by container processes.

15. The method of claim 14, wherein virtualized container resources are controlled by the beancounter.

16. A computer-implemented method for backup optimization in a dedicated container, the method comprising:
(a) launching an OS kernel on a host hardware node;
(b) patching the host OS kernel for selected virtualization of host OS kernel objects;
(c) activating a utility virtualization on-off switch on the host OS kernel objects;
(d) selecting the host OS kernel objects to be virtualized by turning the utility virtualization switch on;
(e) launching a dedicated backup container on the hardware node, the backup container virtualizing the host OS;
(f) virtualizing the selected host OS kernel objects inside the dedicated container; and
(g) starting a host backup utility configured to backup container data,
wherein the host backup utility only backs up the host OS kernel objects that are not virtualized within the dedicated backup container.

17. A system for targeted virtualization in a container, the system comprising:
a processor;
a memory coupled to the processor; and
a computer program logic stored in the memory and executed on the processor, the computer program logic for implementing the steps (a)-(g) of claim 10.

* * * * *